Sept. 7, 1937. J. B. MARTIN 2,092,000
APPARATUS FOR RECOVERING VALUES FROM A SOLUTION
Original Filed Oct. 29, 1932 2 Sheets-Sheet 1
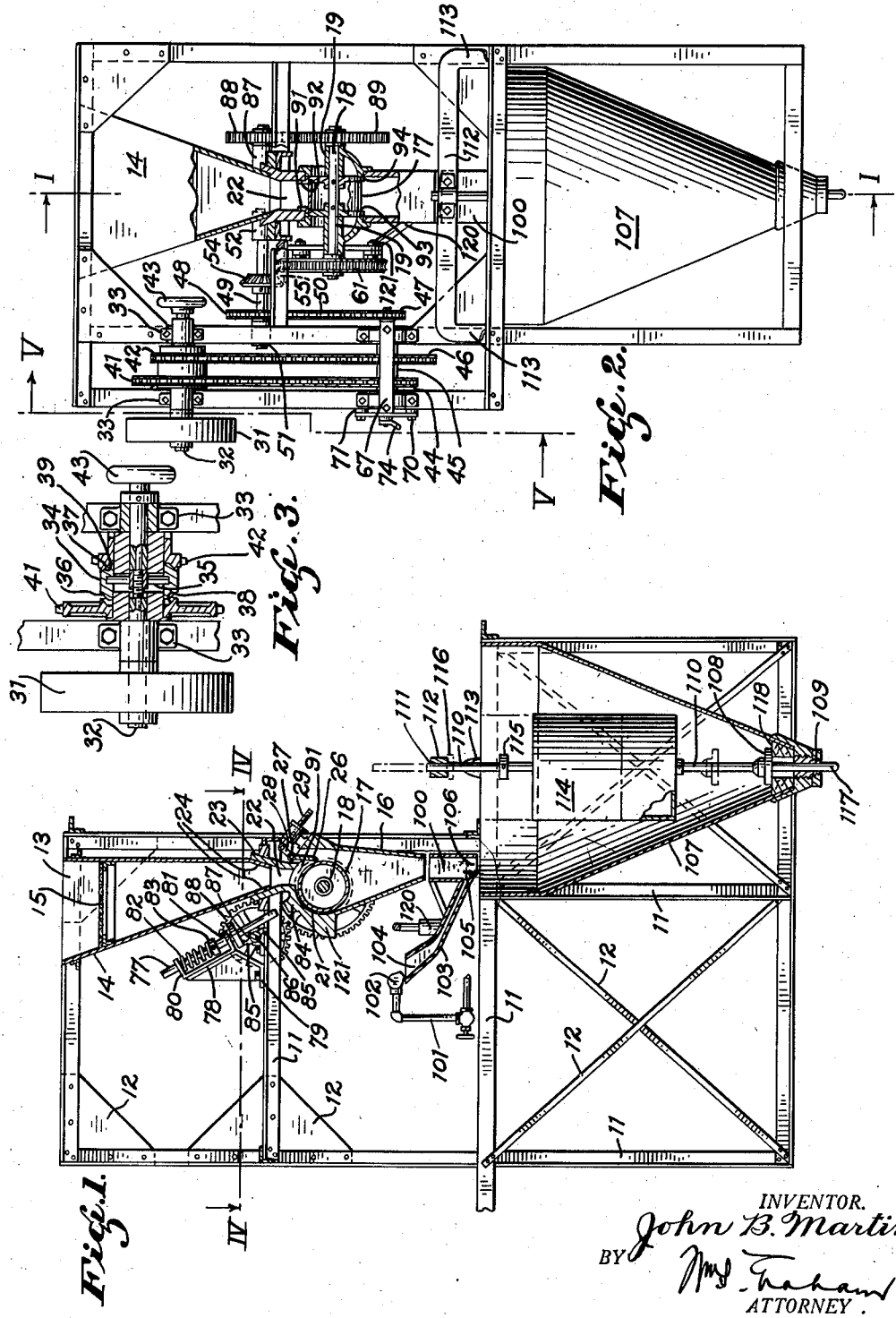
INVENTOR.
John B. Martin
BY
ATTORNEY.

Sept. 7, 1937. J. B. MARTIN 2,092,000
APPARATUS FOR RECOVERING VALUES FROM A SOLUTION
Original Filed Oct. 29, 1932  2 Sheets-Sheet 2
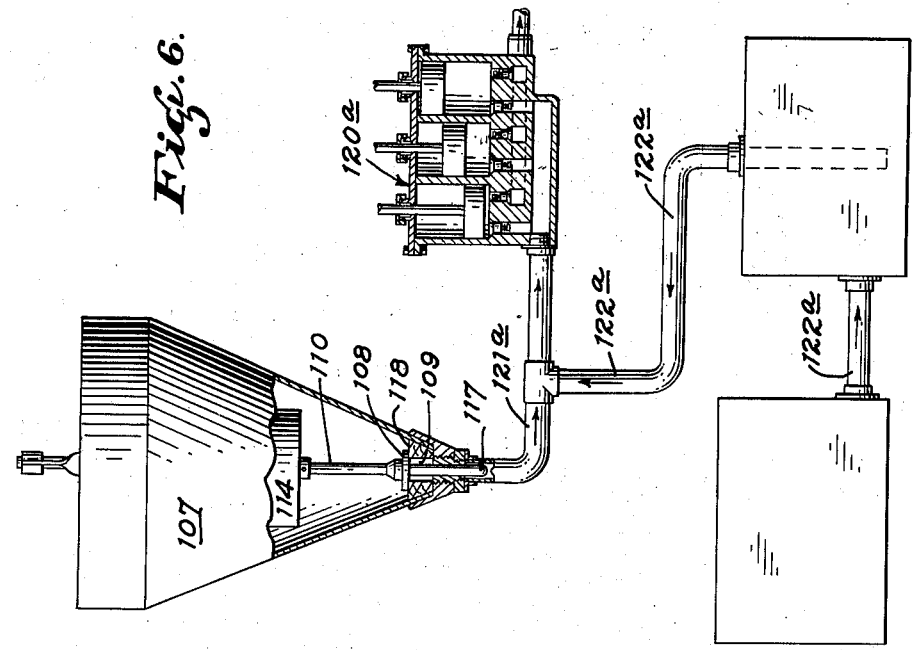
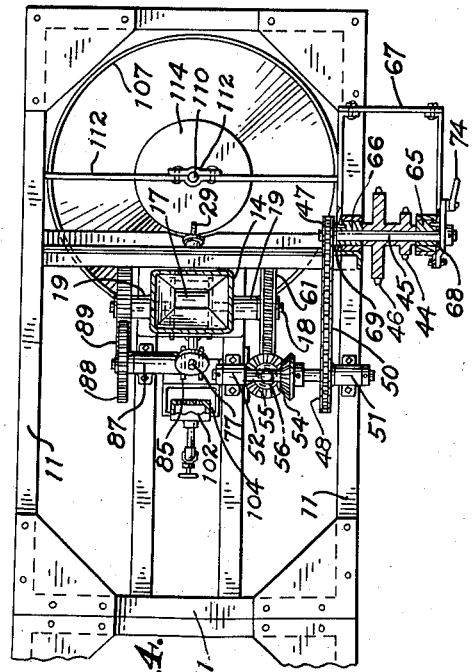
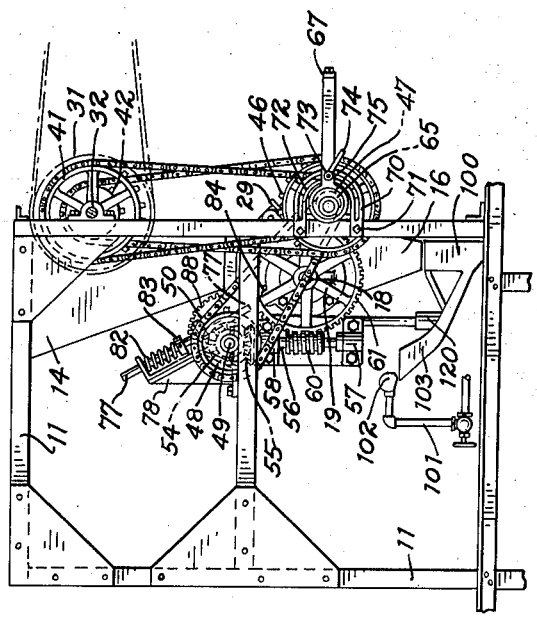

Patented Sept. 7, 1937

2,092,000

UNITED STATES PATENT OFFICE 2,092,000

APPARATUS FOR RECOVERING VALUES FROM A SOLUTION

John B. Martin, Baguio, P. I.

Original application October 29, 1932, Serial No. 640,259. Divided and this application June 24, 1935, Serial No. 28,223

5 Claims. (Cl. 259—18)

This invention relates to apparatus for recovering suspended values from a solution, and more particularly, but not necessarily, for feeding a precipitant, such as zinc dust, to a solution containing suspended values such as a cyanide solution bearing ore values. This application is a division of my invention disclosed in Letters Patent No. 2,010,239, dated Aug. 6, 1935.

It is one object of this invention to provide an improved method and apparatus for feeding a powdered substance to a liquid in such a manner that the powdered substance is brought into intimate molecular contact with said liquid.

Another object is to provide a method and apparatus for mixing a powdered substance with a liquid body, wherein the powdered substance is added to the other said substance in a continuous uniform spray, whereby the powdered substance is brought into intimate molecular contact throughout the body of the liquid substance.

Another object is to provide a novel method and apparatus for feeding a powdered substance to a liquid in such a manner as to distribute the powdered substance evenly and regularly throughout the entire body of a liquid.

Another object is to provide a method and apparatus for mixing a precipitant and a relatively small volume of a liquid, and means and method for agitating the mixture whereby a precipitating process may be facilitated in a relatively larger body of solution containing suspended values.

A further object is to provide a novel method and apparatus having the above characteristics, wherein both the method and apparatus are simple and efficient in operation, and generally to improve on apparatus of this character.

The above and other objects will be apparent throughout the further description of the invention, when taken in connection with the accompanying drawings, wherein like reference characters refer to like parts. It is to be distinctly understood that the drawings are not a definition of the invention, this being defined by the appended claims.

In the drawings:—

Figure 1 is a sectional view taken on the line 1—1 of Figure 2.

Figure 2 is a front elevational view of Figure 1, having certain parts broken away for the purpose of illustration.

Figure 3 is an enlarged sectional detail view of the clutch mechanism embodying the invention.

Figure 4 is a sectional view taken on the line 4—4 of Figure 1.

Figure 5 is a sectional view taken on the line 5—5 of Figure 2.

Figure 6 is an elevational view partly in section and partly diagrammatical showing the manner in which a plunger pump is employed.

The present invention is designed for use wherever the feeding of a powdered substance to a solution or another substance may be required, and particularly where it is desired the powdered solution be fed continuously and in exact amount.

For the sake of simplicity, the present method and apparatus will be described in connection with the process of precipitating gold values from a cyanide solution.

The use of zinc dust as a precipitant for precipitating suspended values from a cyanide solution is well known in the art. However, because of the tendency of zinc dust to take on or absorb moisture from the air, it has been very difficult to obtain efficient feeding of zinc dust to a solution. Many processes and apparatus have been heretofore proposed, but due to absorption of moisture by the zinc dust, the known methods and apparatus fail to feed the zinc dust in a continuous exact amount, since the zinc dust tends to clog and adhere to the feeding apparatus.

Since the percentage of precipitate recovered depends on the thoroughness and intimacy in which the precipitant is mixed with the solution, it has been found necessary to provide a method and apparatus that shall positively feed the zinc dust to the solution in the exact amount required in order to increase the percent of precipitate obtained from the solution.

As stated above, in order to disclose the present invention, the apparatus here described is for the purpose of precipitating the suspended values from a cyanide solution to which zinc dust is added.

In the form shown, a supporting frame is provided which may be constructed of suitable angle irons 11 disposed in vertical and horizontal positions in such number as may be required to provide a rigid and durable support for the apparatus hereinafter described. The frame work may be welded together or bolted, and provided with suitable brace members 12.

The apparatus will be described in the order that the process is carried out.

The zinc dust is placed in the upper end 13 of a hopper 14. The hopper 14 is provided with a screen or sifter 15 disposed in the upper portion of the hopper 14 through which the zinc dust is sifted for finely dividing it. The hopper 14 gradually decreases in diameter from its uppermost portion to its lowermost portion. The lower end of the hopper is formed to receive the upper end of a second hopper 16. Within the hopper 16 and adjacent the upper end thereof is supported a roller 17 by means of a shaft 18, the latter being mounted in the walls of the hopper 16 by suitable bearing surfaces 19. Since the roller is designed to turn in a clockwise direction from the position shown in Fig. 1, a portion of the inner wall of the hopper 16 is formed to closely conform to the adjacent surface of the roller 17, as shown at 21, the purpose of this construction being to prevent any zinc dust from passing between the roller and the close adjacent portion of the hopper 16. The hopper 16 is further provided with the reduced portion 22 upwardly from the roller, the latter terminating in the upwardly flared portion 23, the upwardly flared portion 23 being adapted to receive the lower end of the hopper 14, as shown at 24. It can be seen that the zinc dust falling through the sifter 15 will continue downwardly through the reduced portion 22 of the hopper 16 and into contact with the roller 17.

For the purpose of regulating the feeding of the zinc dust, there is provided a gate 26, the free end of which is adapted to cooperate with the corresponding surface of the roller 17, the other end of the gate being pivoted on a shaft 27. The shaft 27 may be provided with one or more arms 28, the latter being provided with a threaded means 29 for regulating the space or distance between the free end of the gate 26 and the corresponding surface of the roller 17. The threaded means 29 may be graduated for determining the spacing of the gate 26 from the roller 17, as required. The roller 17 is adapted to rotate clockwise, (as viewed in Fig. 1), on the shaft 18 towards the gate 26 and thereby deliver through the gate the required and regulated amount of zinc dust.

Means are provided for rotating the roller 17 at predetermined speeds. In the form shown, power is delivered from a suitable source to a pulley 31, the latter being mounted on a drive shaft 32 which is carried by the frame work and operably supported thereon by any suitable means, such as brackets 33. The drive shaft 32 is operably connected to a clutch member 34 by any suitable means, such as a pin 35 as in Fig. 3. The clutch member 34 is provided with separate clutch faces 36 and 37 respectively; the clutch faces 36 and 37 being adapted for selective connection with clutch faces 38 and 39 respectively; the clutch faces 38 and 39 being carried by sprocket wheels 41 and 42 respectively.

Means is provided for selectively connecting the cooperating clutch faces, such as the actuating wheel 43. The sprocket wheel 41 is connected by a sprocket chain to another sprocket wheel 44 carried by a second shaft 45 mounted on the supporting frame below the shaft 32, and the sprocket wheel 42 is connected by sprocket chain to another sprocket wheel 46 which is also mounted on the shaft 45.

It can be seen therefore that the shaft 45 may be selectively driven through the medium of either the sprocket 41 or sprocket 42, as regulated and determined by actuating the wheel 43, and thereby clutch 34. The inner end of the shaft 45 is provided with a sprocket wheel 47, the latter being connected with a sprocket wheel 48 carried by shaft 49, by means of a sprocket chain 50. The shaft 49 is rotatably mounted on the supporting frame as shown at 51 and 52.

Mounted on the shaft 49 is a beveled gear 54, the latter meshing with a similar gear 55 disposed on the upper end of a vertical shaft 56, the latter also being suitably supported by the frame, as shown at 57 and 58. Shaft 56 is provided with a worm 60, the latter being adapted to mesh with a worm gear 61 carried by one end of the shaft 18 on which the roller 17 is mounted. The roller 17 is therefore rotated by way of the shaft 18, worm gear 61, worm 60, beveled gears 55 and 54, shaft 49, sprocket 48, sprocket chain 50, sprocket 47 and shaft 45, the latter being selectively driven by the sprocket wheels 41 and 44 or 42 and 46, as above described.

Means are provided for shifting the axis of the shaft 45 for the purpose of tightening or loosening the sprocket chain associated with the sprocket wheels 44, 46 and 47. Said means consist of mounting the shaft 45 within eccentric bearings 65 and 66, an operating handle 67 having its free ends 68 and 69 connected in fixed relation with the eccentric bearings 65 and 66 respectively, whereby upon moving the handle in a clockwise or counter-clockwise direction, the axis of the shaft 45 is shifted to the desired position.

Means are also provided for locking the actuating handle 67 in any predetermined position, said means comprising a U-shaped member 70, the latter being rigidly fixed to the supporting frame, as shown at 71, and provided with an arcuate slot 72, the latter being adapted to receive a stud or projection 73 carried by the adjacent arm of the actuating handle 67. The end of the stud 73 may be threaded to receive a locking member 74, whereby the handle 67 may be locked into rigid fixed relation with the U-shaped member, as shown at 75.

In order to prevent the adherence of the zinc dust to the apparatus, there is provided a novel means for vibrating that portion of the apparatus with which the powdered zinc dust comes into contact while it is being fed through hopper 16. Said means comprises a vibrator or tapper member 77, the latter being carried by a suitable support 78 rigidly fixed to the frame 11, as shown at 79. The supporting member 78 is provided with spaced guides 80 and 81 through which the tapper rod 77 passes. The tapper rod 77 is tensionally pressed downwardly by means of a spring 82 disposed around the rod 77 and having one of its ends resting against the inner face of the guide 80, and having its other end resting against the upper face of the collar 83, the latter being in fixed rigid relation with the tapper rod 77. The lower end of the tapper rod 77 is adapted to contact with an enlarged portion or anvil 84 formed on the upper portion of the hopper 16, so as to strike downwardly so that the vibration from the blow is generally axially and downwardly relative to the hopper. A cam member 85 is provided for raising the tapper rod 77 against the tension of the spring 82, the cam 85 being rigidly fixed to a shaft 86, the shaft 86 being supported by the frame 11, as shown at 87, and provided at its other end with a gear 88, the gear 88 meshing with a gear 89 carried on the end of the shaft 18. The ratio between the gears 88 and 89 may be such as required for sifting the zinc dust in the particular local atmospheric conditions.

The operation of the shaft 18 and roller 17 having above been described, it can readily be understood that since gear 89 is carried by the shaft 18, that the tapper mechanism is operated by the cam 85, the latter being driven by way of the shaft 87, gear 88 and gear 89.

Means are further provided for preventing the clogging of the action of the roller by zinc dust, which comprises side plates 91 and 92 positioned within the reduced portion 22 of the hopper 16 for engaging and cooperating with annular flanges 93 and 94 respectively provided on the ends of the roller 17, (see Fig. 2). These side plates 91 and 92 direct the zinc dust directly onto the surface of the roller and prevent any portion of the dust from coming in contact with the adjacent sides of the reduced portion 22. Also since the anvil 84 is formed on the hopper 16, which carries the shaft 18, on which the roller 17 is mounted, and since the lower end of the hopper 14 is in direct contact with the flanged portion 23 of the hopper 16, it follows that the tapper or vibrator mechanism operates to simultaneously vibrate the hoppers 14, 16 and roller 17, thereby positively causing the smallest particles of the zinc dust to continue on its downward course in accordance with the exact amount predetermined by the gate 26.

The lower end of the hopper 16 which is open, terminates in a reduced portion having predetermined dimensions, and is adapted to register with the upper open end of a mixing chamber 100, the dimensions of the mixing chamber being substantially the same as those of the lower end of the hopper 16, so that the zinc dust will fall evenly and completely over the width of surface of a liquid within the mixing chamber 100. This is a very important feature of the invention, since it is necessary that the zinc dust come in contact with the greatest possible surface of the liquid to be treated.

Means are provided for delivering to the zinc mixing chamber 100 the liquid carrier to be treated, which is here being described as a cyanide solution containing suspended values, though a liquid barren of suspended values may likewise be employed, since the mix of zinc and liquid is later incorporated into a main flow of value-bearing liquid. This solution is delivered from a suitable source, by way of a conduit 101 which is provided with a nozzle 102, the latter having a relatively wide mouth or outlet as shown in Fig. 4, and being adapted to spread the solution over the entire bottom surface of a receiving trough 103 which is of slightly greater lateral transverse width than the nozzle mouth. The trough 103, which is slightly inclined, reduces in depth from its open end 104 to a point of outlet into a mixing chamber 100, as shown at 105. The width of the trough 103 is of substantially the same width as the width of the mixing chamber 100, the latter being the same width as the lower end of the hopper 16. By this structure a wide shallow stream of solution is subjected to a feed of precipitant or zinc dust throughout its entire width and since the solution is of shallow depth, the feed of precipitant may be regulated with exactness and thoroughly dispersed throughout the liquid solution.

It has been found by feeding the solution into the mixing chamber at a predetermined rate by volume, and spraying into the mixing chamber a predetermined amount of zinc dust by weight, that a more intimate thorough mixing of the zinc dust and solution is obtained.

The trough 103 and mixing chamber 100 is mounted in swinging relation to the hopper 16, which mounting consists of a support 120 fixed to the trough 103 and extending upwardly and turnably engaging an enlarged portion 121 of the hopper 16. This construction is advisable since it vibrates trough 103 with the hopper and evenly spreads the fluid feed from the outlet 105; and as it is often necessary to determine the amount of precipitant passing by the gate 26, it permits swinging the mixing chamber 100 by means of the swinging support 120 free of the opening in the bottom of the hopper 16 where the precipitant may be caught in another container, and the exact amount by weight may be measured and the gate 26 set to permit the desired amount to pass therethrough.

After mixing the zinc dust and the liquid in mixing chamber 100, the fluid is then transferred by way of the opening 106 in the bottom of the mixing chamber 100 to an emulsifying cone 107.

A novel float valve 108 is provided within the cone for intermittently permitting the emulsion in the cone to pass by way of the valve 108 through the opening 109 to a pump, represented in its entirety by 120$^a$, (preferably a triplex plunger pump) where the emulsion flowing from the cone 107 through the outlet conduit as indicated by the arrow 121$^a$, comes into contact with the full flow in the conduit indicated by the arrows 122$^a$ of the main supply of the pregnant solution to be treated at the pump 120$^a$, and after leaving the pump is then delivered into a suitable set of bags or filters (not shown) where the values are recovered by well-known processes (vacuum or pressure processes).

The valve 108 is provided with a valve stem 110 which extends vertically up through the cone and through an opening 111 provided in a guide member 112. The guide member 112 extends above and across the top of the cone having downwardly turned portions 113, the ends of which are rigidly fixed to the outer cooperating edges of the cone. Intermediate the length of the valve stem is provided a float 114, which is adapted to raise the valve 108 when the emulsion in the cone rises to a predetermined level.

The valve stem 110 is provided with a stop or collar 115, which is adapted to limit the upward movement of the float 114. The stop member 115 engages the bottom surface of the guide member 112, as shown in dotted lines at 116. To more perfectly align the valve with its seat 118, the valve 108 is further provided with a stem 117 extending downwardly from the face of the valve through the opening 109.

It therefore follows that the upward and downward movement of the float and valve will be dependent in a major degree upon the rate that the emulsion or mixture is fed to the cone, but also in a minor degree by an upward and downward movement of the valve and float which is also caused by the fact that the pump on the up or suction strokes of the pistons will draw or suck on the liquid in both conduits indicated by arrows 121$^a$ and 122$^a$ and will thus seat the valve 108 regardless of the height of liquid in the cone and the buoyant effect of float 114. When the down or pressure stroke takes place in the engine cylinders, the suction on the valve 108 through conduit from the cone ceases by reason of seating the intake valves of the engine, and the float then is again effected by its buoyancy to raise the valve dead from its seat. The unseating of the valve is also affected by center points at the ends of the upper and lower movements of the pistons of pump 120$^a$, which causes an instantaneous thrust on the solution, in the conduit indicated 121ᵃ. This almost instantaneous interval of interruption of piston force at the upper and lower dead points of the piston-stroke, causes the suction so to speak, to act hesitatingly for that instant, and this is reflected in turn by release of suction upon the valve mechanism 108, thereby causing intermittent responsive movement of the float upwards and downwards, creating the agitation necessary to keep the emulsion well mixed and the precipitant in constant suspension and also maintaining an intermittent feed from the cone at very short intervals and in small amounts at each interval. Particular emphasis is directed towards the importance of the function of the plunger pump, and this feature may be more clearly understood by pointing out that if the plunger pump, here illustrated, was removed from the system and a centrifugal pump substituted therefor, the present apparatus would be less efficient, as the agitation within the cone, due to the upward and downward movement of the valve 108 and float 114, would be so sluggish and infrequent that the agitation produced thereby would be insufficient to properly and continually mix the emulsion. In other words, in case of the centrifugal pump, the opening of the valve would be dependent solely upon the float 114 to raise the valve 108. Also this would be retarded by the slight vacuum effect produced or existing below the valve 108, while in the case where the plunger pump is employed, the pulsation set up by the plunger pump operates to destroy the vacuum effect below the valve 108 and tends to unseat the valve 108. The valve seat 118, which is preferably made of porous material such as wood, also assists in the instantaneous action of the valve by prevention of the sticking of the valve, due to any vacuum effect which may occur below the valve. This is thought to be due to the fact that the wooden seat is somewhat porous and that the contact between the valve 108 and seat 118, when the valve is in its closed position, does not form a completely leak-proof contact. Furthermore, it will be understood from the foregoing, that in the present illustration, where a triplex pump is employed, the valve 108 opens three times during every revolution of the pump.

The float mechanism also acts as a check against the inclusion of air in the agitated precipitant and liquid in the cone, since agitation is provided in the cone by movement of the valve in the lower part thereof rather than agitation with a mechanical beater, which is a very important feature in the process.

While I have illustrated and described one embodiment of the invention, it will be understood by those skilled in the art that certain changes, substitutions, modifications, additions and omissions may be made in the structure herein illustrated without departing from the spirit and scope of the invention as defined by the appended claims.

What I claim is:

1. In a precipitation apparatus, a combination of means for mixing a precipitant and a liquid, an agitation chamber for receiving the mixed precipitant and liquid and having an inlet and an outlet, a float in the agitation chamber and a valve in the said outlet operable by said float, a conduit member in communication with said outlet, and a pulsating pump connected in said outlet conduit and adapted for pumping the fluid in said outlet conduit and for unseating said outlet valve responsive to the pulsations of said pump.

2. In a precipitation apparatus a means for feeding a mixture of a precipitant agent and a liquid, an agitation chamber for receiving the mixed precipitant and liquid, said agitation chamber having an inlet and an outlet and being of greater diameter at its inlet portion than at its outlet portion, a float in the agitation chamber, and a valve in said outlet operable by said float, a conduit member in communication with said outlet and a pulsating pump connected in said outlet conduit.

3. In a precipitation apparatus means for feeding a mixture of a precipitant agent, a liquid, an agitation chamber for receiving the mixed precipitant and liquid, said agitation chamber having an inlet and an outlet, a float in the agitation chamber, a valve in said outlet operable by said float, a conduit member in communication with said outlet and a pulsating pump connected in said outlet conduit, said valve having a porous seat.

4. In a precipitation apparatus which has a feed for a mixture of pregnant liquid and a precipitant, an agitation chamber for receiving the mixed precipitant and liquid, said chamber having an inlet and an outlet, a float in the agitation chamber, a valve in the said outlet operable by said float, a conduit member in communication with said outlet and a pulsating pump connected in said outlet conduit.

5. In a precipitation apparatus the combination of means for feeding a mixed precipitant and a liquid having ore values suspended therein, an agitation chamber for receiving the mixed precipitant and liquid, said agitation chamber having an inlet and an outlet, a float in the agitation chamber, and a valve in said outlet operable by said float, said valve having a porous seat at said opening.

JOHN B. MARTIN.